United States Patent
Latifi et al.

(10) Patent No.: US 12,548,396 B2
(45) Date of Patent: Feb. 10, 2026

(54) ONLINE CASINO VIRTUAL PLAYERS

(71) Applicant: IGT, Las Vegas, NV (US)

(72) Inventors: Soheil Latifi, Moncton (CA); Stefan Keilwert, St. Josef (AT); Sven Aurich, Schwanberg (AT); David Froy, Lakeville-Westmorland (CA); Michael Russ, Graz (AT)

(73) Assignee: IGT, Las Vegas, NV (US)

( * ) Notice: Subject to any disclaimer, the term of this patent is extended or adjusted under 35 U.S.C. 154(b) by 299 days.

(21) Appl. No.: 18/195,531

(22) Filed: May 10, 2023

(65) Prior Publication Data

US 2024/0378940 A1 Nov. 14, 2024

(51) Int. Cl.
*G07F 17/32* (2006.01)
*G06N 20/00* (2019.01)

(52) U.S. Cl.
CPC ......... *G07F 17/3213* (2013.01); *G06N 20/00* (2019.01); *G07F 17/3223* (2013.01); *G07F 17/3237* (2013.01); *G07F 17/3288* (2013.01)

(58) Field of Classification Search
None
See application file for complete search history.

(56) References Cited

U.S. PATENT DOCUMENTS

| 8,147,334 | B2 | 4/2012 | Gatto et al. |
| 8,393,948 | B2 | 3/2013 | Allen et al. |
| 8,460,099 | B2 | 6/2013 | Barclay et al. |
| 8,764,566 | B2 | 7/2014 | Miltenberger |
| 8,801,522 | B2 | 8/2014 | Guinn |
| 10,874,949 | B2 | 12/2020 | Vaccari et al. |
| 10,918,948 | B2 | 2/2021 | Yannakakis et al. |
| 2010/0121808 | A1 | 5/2010 | Kuhn |
| 2020/0368626 | A1 | 11/2020 | Kang |

FOREIGN PATENT DOCUMENTS

| DE | 102013203402 | 8/2014 |
| WO | WO 2022/215874 | 10/2022 |

*Primary Examiner* — Damon J Pierce
(74) *Attorney, Agent, or Firm* — Sheridan Ross P.C.

(57) ABSTRACT

Embodiments are directed to using artificially intelligent bots to represent automated, virtual entities in a virtual casino. According to one embodiment, providing a virtual casino can comprise maintaining a model of virtual casino interactions representing interactions between entities in a gaming environment. The interactions between entities in the gaming environment represented by the model comprise can comprise verbal communications and physical actions. A representation of the virtual casino can be presented to a user device through a communications network. A bot for an entity can be generated based on the model and a representation of the bot for the entity in the virtual casino can be presented through the communications network to the user device. The bot can interact with a human player in the virtual casino through the presented representation of the bot based on the model and using a natural language processing system.

19 Claims, 7 Drawing Sheets

ONLINE CASINO VIRTUAL PLAYERS

BACKGROUND

The present disclosure is generally directed to operating a virtual casino and, in particular, to using artificially intelligent bots to represent automated, virtual entities in the virtual casino.

With the rise of the internet, online casinos have come to the scene. These virtual casinos allow players to experience the atmosphere of the casino remotely. The main shortcoming of such casinos is that the social aspects of a physical casino experience are lost. Although some players might prefer the online casinos over real world options because of lack of social interactions, some players might avoid these venues for the exact issue. Hence there is a need in the art for improved methods and systems for operating a virtual casino.

BRIEF SUMMARY

Embodiments of the present disclosure are directed to using artificially intelligent bots to represent automated, virtual entities, e.g., other players, spectators, dealers, casino staff, etc., in the virtual casino. According to one embodiment, a method for providing a virtual casino can comprise maintaining a model of virtual casino interactions representing interactions between entities in a gaming environment. The interactions between entities in the gaming environment represented by the model comprise can comprise verbal communications and physical actions.

Maintaining the model of interactions between entities in a gaming environment can comprise monitoring interactions between a plurality of players in the virtual casino and training the model based on the monitored interactions between the plurality of players in the virtual casino. Additionally, or alternatively, maintaining the model of interactions between entities in a gaming environment can comprise monitoring interactions between a plurality of players in a physical casino and training the model based on the monitored interactions between the plurality of players in the physical casino. Maintaining the model of interactions between entities in a gaming environment can additionally, or alternatively, comprise monitoring the interacting with the human player in the virtual casino through the presented representation of the bot and training the model based on the monitored interacting with the human player in the virtual casino through the presented representation of the bot.

A representation of the virtual casino can be presented to a user device through a communications network. A bot for an entity can be generated based on the model and a representation of the bot for the entity in the virtual casino can be presented through the communications network to the user device. The bot can interact with a human player in the virtual casino through the presented representation of the bot based on the model and using a natural language processing system. For example, the bot for the entity can comprise a bot representing a player in the virtual casino. In such cases, interacting with the human player in the virtual casino through the presented representation of the bot can comprise playing a game with the human player. In other example, the bot for the entity can comprise a bot representing a spectator in the virtual casino and/or a bot representing a staff member in the virtual casino.

According to another embodiment, a system can comprise a communications interface, a processor coupled with the communications interface, and a memory coupled with a and readable by the processor. The memory can store therein a set of instructions which, when executed by the processor, causes the processor to maintain a model of virtual casino interactions representing interactions between entities in a gaming environment. The interactions between entities in the gaming environment represented by the model comprise verbal communications and physical actions. The instructions can further cause the processor to present a representation of the virtual casino to a user device through the communications interface. The instructions can further cause the processor to generate a bot for an entity can be based on the model and present a representation of the bot for the entity in the virtual casino through the communication interface to the user device. The instructions can then cause the processor to interact with a first human player in the virtual casino through the presented representation of the bot based on the model and using a natural language processing system.

In some cases, the bot for the entity can comprise a bot for the first human player. In such cases, interacting with the first human player in the virtual casino through the representation of the bot can comprise interacting with a second human player in the virtual casino. For example, interacting with the second human player in the virtual casino comprises conducting a game with the first human player and the second human player. In another example, interacting with the first human player in the virtual casino through the representation of the bot comprises providing a recommendation to the first human player. In yet another example, interacting with the first human player in the virtual casino through the representation of the bot comprises providing a responsible gaming prompt.

According to yet another embodiment, a non-transitory, computer-readable medium can comprise a set of instructions stored therein which, when executed by a processor, causes the processor to train a model of virtual casino interactions representing interactions between entities in a gaming environment. The interactions between entities in the gaming environment represented by the model can comprise verbal communications and physical actions. The instructions can further cause the processor to present a representation of the virtual casino through a communications interface to a user device, generate a bot for an entity based on the model, present a representation of the bot for the entity in the virtual casino presented through the communications interface to the user device, and interact with a human player in the virtual casino through the presented representation of the bot based on the model and using a natural language processing system.

For example, the instructions can further cause the processor to receive an information feed and interact with the human player based on the received information feed. In some cases, the bot can be configurable by the human player. Additionally, or alternatively, the bot can be automatically generated by a virtual casino management system. The representation of the bot for the entity can comprise a representation of a human, an animal, or others.

Additional features and advantages are described herein and will be apparent from the following Description and the figures.

DETAILED DESCRIPTION

Embodiments of the present disclosure are directed to the use of online bots in a virtual casino. As known in the art and as used herein, a bot is a software application that runs automated tasks, e.g., scripts or programs, over a network such as the Internet, to imitate human activity such as messaging. Embodiments disclosed herein include bots that talk to and otherwise interact with players in a virtual casino, e.g., send them messages, ask to play games with them, etc. and ultimately fill lack of real-world players at times missing in virtual reality. The suggested bots can play the games just like real players, trash talk the human players, socialize about current event, trending socio-economic issues, etc.

According to various embodiments, many different types of bots may be deployed within the virtual casino environment in an attempt to recreate a physical casino environment. That is, embodiments not only include game playing bots, but also spectators, recommenders, random price awarders, animal-like bots, casino staff bots, and others, making a virtual casino more satisfying and natural. Each bot can be represented in various ways including, but not limited to a graphical avatar that moves about the virtual casino and interacts with other avatars representing other entities, human or virtual, in the virtual casino.

Online, virtual casinos are big rivals of real-life, physical casinos, but when it comes to competing with social aspects of physical casinos they fall off. This can cause a loss of players and interest in such venues. Even though the virtual casinos are open to many more players, this does not mean that the players are interested in initiating a conversation with online strangers or people with anonymous identities. The bots according to embodiments described herein can address this shortcoming and fill the gap between virtual casinos and real-world casinos thereby increasing player engagement, use, and therefore revenues for the operator of the virtual casino.

Figure 1:
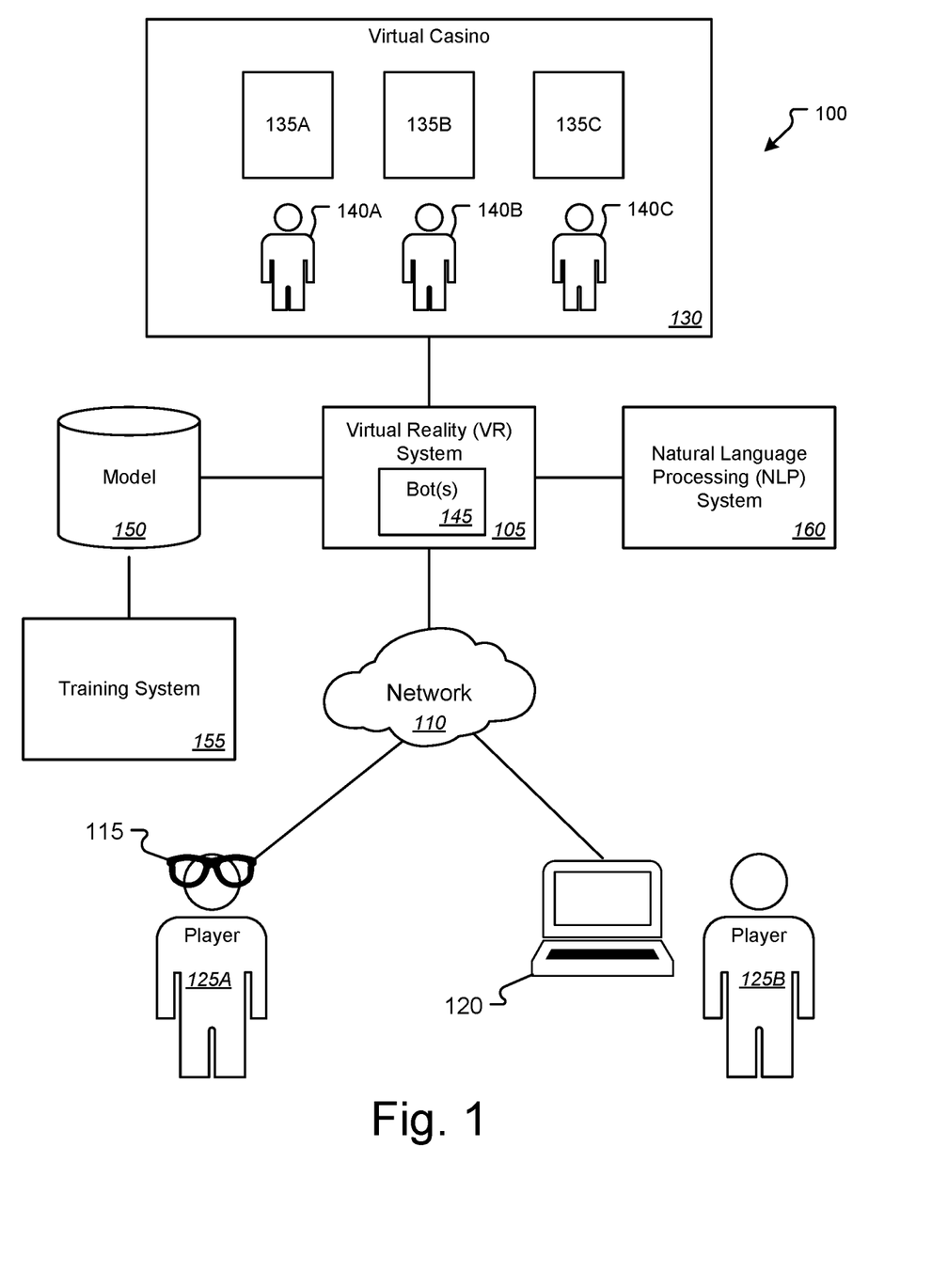
FIG. 1 is a diagram illustrating an exemplary environment in which embodiments of the present disclosure may be implemented.

FIG. 1 is a diagram illustrating an exemplary environment in which embodiments of the present disclosure may be implemented. As illustrated in this example, the environment 100 can include a VR system 105 communicatively coupled with a communications network 110. The communications network 110 can comprise any one or more wired and/or wireless local area and/or wide area networks as known in the art including, but not limited to, the Internet. Also coupled with the communications network 110 can be any number of VR user devices 115 and 120 such a wearable headset, glasses, etc., a mobile device such as a smartphone, tablet, personal computer, etc. as known in the art.

Through the VR devices 115 and 120, the VR system 105 can provide to players 122A and 125B a representation of a virtual casino 130. The virtual casino 130 can comprise one or more virtual Electronic Gaming Machines (EGMs) or other virtual gaming systems 135A-135C and each user can be represented by an avatar 140A and 140B. Through the VR devices 115 and 120, the VR system 105 can allow the players 125A and 125B to move their avatars 140A and 140B around the virtual casino 130, interact with the virtual gaming systems 135A-135C, interact with each other, etc. For example, a player 125A can manipulate his avatar 140A to interact with a virtual gaming system 135A to play an electronic game such as slots, video poker, a table game, or any other casino game.

According to one embodiment, the VR system 145 can generate one or more bots 160 representing any of a variety of different entities in the virtual casino 130. These entities can be represented by an avatar 140C which can interact with avatars 140A and 140B of players within the virtual casino 130. These bots 160 can be operated by artificially intelligent processes executed by the VR system 105 based on one or more models 150 maintained within or accessible by the VR system 105. The model(s) 150 can represent interactions between entities in the virtual casino 130 including both verbal communications as well as physical actions.

As illustrated here, the environment 100 can also include a training system 155 adapted to maintain and train the one or more models 150. While illustrated here as separate from the VR system 105 for the sake of clarity and illustrative purposes, it should be understood that, in other implementations, the training system 155 may be implemented as part of the VR system 105. Generally speaking, the training system 155 can generate, maintain, and train the models using reinforcement learning methods as known in the art. This training can be conducted by the training system using a variety of inputs. For example, the VR system 105 and/or training system 155 can monitor the communications and actions of players 125A and 125B within the virtual casino 130 and train a model 150 representing players. Additionally, or alternatively, the training system 155 may monitor players in a real-world, physical casino, e.g., through cameras, microphones, gaming systems, etc. installed in the gaming venue and train a player model 150 based on the actions and interactions of those players. In yet another example, the VR system 105 and/or training system 155 can monitor interaction between avatars 140A and 140B of players 125A and 125B and an avatar 140C of a bot 145 in the virtual casino 130 and train the model 150 used by that bot 145 based on those interactions.

Also as illustrated here, the environment 100 can include a Natural Language Processing (NLP) system 160. While illustrated here as separate from the VR system 105 and training system 155 for the sake of clarity and illustrative purposes, it should be understood that, in other implementations, the NLP system 160 may be implemented as part of the VR system 105 and/or training system 155. Generally speaking, the NLP system can receive requests from the VR system to generate natural language communications for use by a bot 145 based on the model 150 for that bot using methods as known in the art. The generated natural language communications can comprise text and/or audio streams. Similarly, the NLP system 160 can receive from the VR system 105 natural language communications of a player 115 in the virtual casino 130 and process that communications, e.g., into entities, intents, and sentiments using methods as known in the art, for use by the VR system 105.

Thus, players 125A and 125B can interact with each other through their avatars and/or interact with an avatar 140C for a bot 145 in the virtual casino. For example, the bot 145 can operate as a virtual player based on a model 150 trained to represent actions and communications of a player. In this way, a player 125A can, for example, meet the avatar 140C of the bot 145 in a public of private virtual room of the virtual casino 130 to play a game with the bot 145. For example, two games can be played simultaneously on one virtual EGM 135A, one game by the player 125A and one game by the bot 145, with both playing against each other for some achievement such as highest base game win, longest free-game session, etc. According to one embodiment, additional awards can be paid when the player beats the bot, like bonus wins. The bot 145 can comment on game play and/or events of the session, both of its own game and the player's game. Additionally, or alternative, and according to one embodiment, the bot's language can be tailored to a character it represents based on the model 150 for that bot, e.g., a princess, cowboy, sorcerer, etc. In such embodiments, each bot's character can have unique capabilities such as game rules, language, sounds, graphics/animations, mystery events etc.

According to another embodiment, the bot 145 may represent or otherwise be associated with a player 125A. For example, the bot 145 can recommend hot games, present win odds when player is prompted to make an in-game selection, recommend betting up/down, i.e., provide responsible gaming guidance, etc. Such responsible gaming guidance may suggest a break, reducing wager amounts or rate, remind the player of an upcoming appointment, etc. In another example, the bot 145 can play a game on the players behalf when the player is not "in front of" the virtual EGM, e.g., visits restroom or is not actively participating in the virtual casino 130. According to one embodiment, the bot 145 can earn achievements which represent actions that the bot 145 has completed on behalf of the player 125A such as triggering bonus in certain games, achieving certain win conditions, etc. Additionally, or alternatively, the bot 145 can have badges that are based upon achievements and are displayed on the avatar's 140C visual representation.

According to one embodiment, the bot 145 can take over game play, through an avatar 140A for a player 125A when the player 125A logs out and can continue the interactions of the player 125A. Once the player 125A logs back in, the player 125A could take back control over the avatar 140A from the bot 145 and continue to interact in the virtual casino 130. This way a user does not see players and bots blinking out existence and can feel more like a living breathing casino experience. The bot 145 could also be trained based on the player 125A to continue player behaviors that it is trained on so that the simulation of the player 125A is harder to distinguish from the bot 145 by other players.

In some cases, the bot can be connected to personal devices of the player 125A to inform player 125A, e.g., through a text message, email, voice call, etc., about game events in the virtual casino 130. In such cases, the player 145 can configure capabilities and communication events of the bot 145.

Bots 145 can be represented by a virtual avatar 140C which can be configured by the player 125A. For example, the voice can be configured for the bot 145 to match gender and other preferences of the user. These configuration settings can be shared with a game that player 125A is playing. The configuration can also include clothing the avatar is wearing and other aspects of the avatar. In such cases, the player 125A may be able to purchase or win additional avatar clothing & customization options, e.g., hair style, colors, clothing, accessories. In some cases, artificial intelligence process of the VR system 105 could generate a customized avatar or modify an existing avatar to match the player's mood and current game experience.

According to one embodiment, the VR system 105 can use a skeletal animation system as well as facial generation methods as known in the art to animate the face of the avatar 140C for the bot 145 to match the generated voice for the bot 145. This can be done with a two-dimensional or three-dimensional graphical style. In some cases, the avatar 140C for the bot can show emotions on the face as well as body language to give feedback to the player 125A based upon the output of the bot. In chat windows, the avatar 140C can have different facial features displayed in a chat log, received from the bot 145.

According to one embodiment, a player 125A can decide to have a bot 145 play against another player's 125B bot in a challenge or tournament. In such cases, each player's bot can be preconfigured by that player, e.g., play calm, greedy, set budget, etc., and play rules can be set. Each player can have the option to take over anytime during bot-play. In some cases, the best performing bots can be listed on a high-score. Additionally, or alternatively, other players can bet on the performance of these bots in the next tournament.

According to one embodiment, the bot 145 can receive external information such as news feeds and talk with the player 125A about the latest news. Additionally, or alternatively, the bot 145 can listen to the music the player 125A is listening and start talking about the music. If the bot 145 has learned a player's favorite music, it can suggest tickets for a concert with a visit to a real casino.

In some cases, there may be no apparent differentiation or distinction between real players and bots. That is, the human player 125A would not know if they are interacting with a bot or another human player. The virtual casino floor would not feel that empty when there are just few real players if bot players were added. The whole virtual casino experience would feel more satisfying and natural.

According to one embodiment, virtual rivals and friendships between human players as well as between human players and bots can be recorded. Such rivals can be a reason a player comes back to play. To build such rivalries, a model 150 for a bot 145 may include pre-quitting trash talk. That is, when a player stop playing, the bot 145 can trash talk them. In another example, the bot 145 can remember beating a player and can use this information to trash-talk them even more. If the bot 145 get beat, it can remember to ask for another play again.

According to one embodiment, models 150 can be trained for spectator and recommender bots. For example, a bot 145 with an avatar 140C "standing behind" the avatar 140A for the player 125A in the crowd and watching can give recommendations on the game, based on what they have already experienced in the game. Other models 1550 can be defined for random incentivizer bots 145. These bots 145 can have avatars 140C "walking around" in the virtual casino 130 and awarding players randomly with incentives. This would be perceived significantly different by the player, compared to getting an incentive from the game. For example, if these incentives are only available from bots 145 in the virtual casino 130, and they give the player something, the player will remember the "great experience" they had with these bots in the virtual casino 130. Such incentives could be, for example, a voucher for free credits to be redeemed at a certain game which has the added benefit of drawing the player's attention to another online game, cash, certain in-game triggers, features, or symbols to be redeemed any time desired, etc. In some cases, the bot 145 would not only give the incentive to the player 125A but also explain why they gave it to them. The player 125A could also follow up with a conversation with the bot, such as asking who they are, what they are doing in the virtual casino 130, how many vouchers they have given out today, etc.

Additionally, or alternatively, models 150 could be trained for animal bots 145. As animals are not allowed in most of the casinos, virtual casinos could have "animals-like" bots that players can "bring" with them to the virtual casino 130. While playing, the avatar for the bot 145 could sit next to the player's avatar playing the game and raise their attention from time to time, e.g., because they are hungry, they want to be stroked, or they could even react to the game in certain moments. The model 150 for such a bot could define with real animal-like behaviors and needs. When "walking" through the virtual casino floor and "see" other players' animal-like bots, there could be friendships defined based on the reaction of their bots to each other.

According to one embodiment, models 150 can be trained for casino staff bots. Such bots 145 can help create a more realistic experience similar to real-life, physical casinos. Staff bots 145 could be asked questions, such as to explain rules of games via a natural conversation, ask organizational questions about the virtual casino, or, if they are "too busy", do some chit-chat with the player, etc. This could be dealer bots, doing both their job of dealing in the virtual game but also talking to the players about basically anything. Another example can be security bots which can also have a real security-like role in the virtual casino, such as preceding bad behavior or other players based on their language use, behavior to other players, etc.

Figure 2:
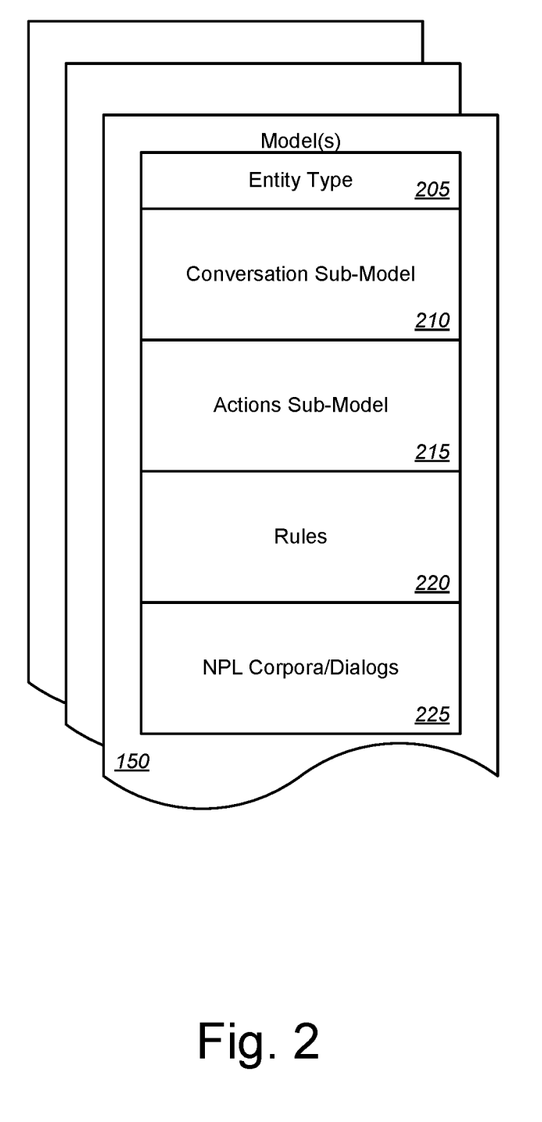
FIG. 2 is a diagram illustrating elements of an exemplary model for a virtual entity in a virtual casino according to one embodiment of the present disclosure.

FIG. 2 is a diagram illustrating elements of an exemplary model for a virtual entity in a virtual casino according to one embodiment of the present disclosure. As illustrated in this example, each model 150 can comprise an entity type identifier 205 indicating a type of entity for which the model 150 can be used, e.g., a player, a casino staff member, a spectator, etc. As noted above, interactions between entities in the gaming environment represented by the model 150 can comprise verbal communications and physical actions. Therefore, and according to one embodiment, the model 150 can comprise a conversation sub-model 210 representing and/or defining verbal communications or interactions between entities in the virtual casino 130 and an actions sub-model 215 representing and/or defining physical interactions between entities in the virtual casino 145.

Optionally, the model can comprise a set of rules 220. These rules 220 can comprise constraints to be placed on interactions generated by the VR system 105. The rules may be defined and applied depending upon the entity type. For example, a casino staff type entity may be constrained to prevent the use of profanity or to prevent that entity's avatar 140C from "touching" or being within a certain "personal zone" of a player's avatar 140A within the virtual casino. Additionally, or alternatively, the model 150 can comprise an NPL corpora and/or set of dialogs 225. The NPL corpora and/or set of dialogs 225 can be used by the NLP system 160 to interpret and/or generate human speech within the virtual casino 130. In other embodiments, the NPL corpora and/or set of dialogs 225 may be maintained elsewhere such as within or by the NPL system 155.

Figure 3:
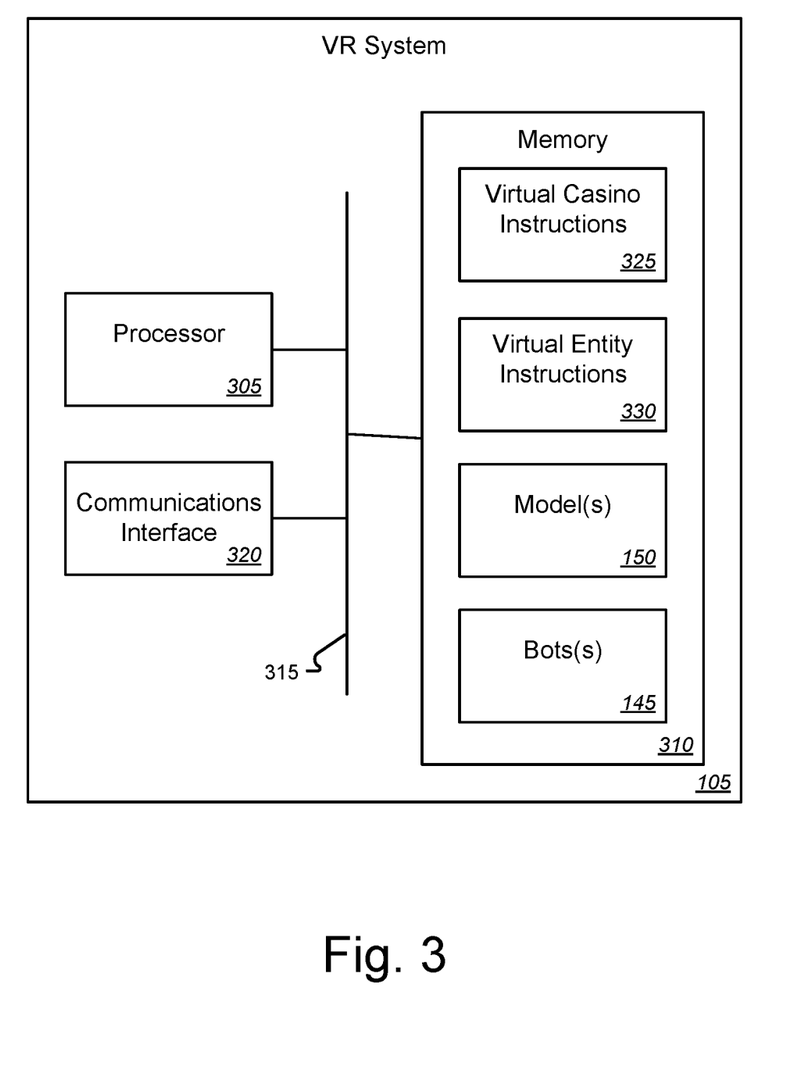
FIG. 3 is a block diagram illustrating additional details of components of an exemplary virtual reality system according to one embodiment of the present disclosure.

FIG. 3 is a block diagram illustrating additional details of components of an exemplary virtual reality system according to one embodiment of the present disclosure. As illustrated in this example, the VR system 105 can comprise a processor 305. The processor 305 may correspond to one or many computer processing devices. For instance, the processor 305 may be provided as silicon, as a Field Programmable Gate Array (FPGA), an Application-Specific Integrated Circuit (ASIC), any other type of Integrated Circuit (IC) chip, a collection of IC chips, or the like. As a more specific example, the processor 305 may be provided as a microprocessor, Central Processing Unit (CPU), or plurality of microprocessors that are configured to execute the instructions sets stored in a memory 310. Upon executing the instruction sets stored in memory 310, the processor 305 enables various functions of the VR system 105 as described herein.

The memory 310 can be coupled with and readable by the processor 305 via a communications bus 315. The memory 310 may include any type of computer memory device or collection of computer memory devices. Non-limiting examples of memory 410 include Random Access Memory (RAM), Read Only Memory (ROM), flash memory, Electronically-Erasable Programmable ROM (EEPROM), Dynamic RAM (DRAM), etc. The memory 310 may be configured to store the instruction sets depicted in addition to temporarily storing data for the processor 305 to execute various types of routines or functions.

The processor 305 can also be coupled with one or more communications interfaces 320. The communication interfaces 320 can comprise, for example, Ethernet, Bluetooth, WiFi, or other type of wired or wireless communications interfaces.

The memory 310 can store therein a set of virtual casino instructions 325 which, when executed by the processor 305, causes the processor 305 to provide, via the communications interface 320, to a plurality of user devices 115 and 120, a representation of the virtual casino 130. The virtual casino instructions 325 can cause the processor 305 to represent a user 125A and 125B of each of the plurality of user devices 115 and 120 by an avatar 140A and 140B in the virtual casino 130. The virtual casino instructions 325 can cause the processor 305 to execute an electronic game within the virtual casino 130 and provide a representation of the electronic game, e.g., as a virtual EGM of other virtual gaming system 135A, to a user device 115.

The memory can also store a set of virtual entity instructions 330 which, when executed by the processor 305, can cause the processor 305 to maintain or access a model 150 of virtual casino interactions representing interactions between entities in a gaming environment. The interactions between entities in the gaming environment represented by the model 150 can comprise verbal communications and physical actions. The virtual entity instructions 330 can further causes the processor 305 to generate a bot 145 for an entity based on the model 150 and present a representation, e.g., an avatar 140C of the bot 145 for the entity in the virtual casino 130 through the communication interface 320 to the user device 115. The virtual entity instructions 330 can then cause the processor 305 to interact with a human player 125A in the virtual casino through the presented representation 140C of the bot 145 based on the model 150 and using a natural language processing system 155.

For example, the bot 145 for the entity can comprise a bot 145 representing a virtual player in the virtual casino 130. In such cases, interacting with the human player 125A in the virtual casino 130 through the presented representation 140C of the bot 145 can comprise playing a game with the human player 125A. In other example, the bot for the entity can comprise a bot 145 representing a spectator in the virtual casino 130 and/or a bot 145 representing a staff member in the virtual casino 130.

In some cases, the bot 145 for the entity can comprise a bot 145 for the human player 125A. In such cases, interacting with the human player 125A in the virtual casino 130 through the representation 140A of the bot can comprise interacting with a second human player 125B in the virtual casino 130. For example, interacting with the second human player 125B in the virtual casino 130 can comprise conducting a game between the first human player 125A and the second human player 125B. In another example, interacting with the first human player 125A in the virtual casino 130 through the representation 140C of the bot 145 can comprise providing a recommendation to the first human player 125A. In yet another example, interacting with the first human player 125A in the virtual casino 130 through the representation of the bot 145 can comprise providing a responsible gaming prompt.

According to one embodiment, the virtual entity instructions 330 can further cause the processor 305 to receive, through the communications interface 320, an information feed and interact with the human player 125A based on the received information feed. In some cases, the bot 145 can be configurable by the human player 125A. Additionally, or alternatively, the bot 145 can be automatically generated by the processor 305 when executing the virtual entity instructions 330. The representation 140C of the bot 145 for the entity can comprise a representation of a human, an animal, a fictional character, or others.

Figure 4:
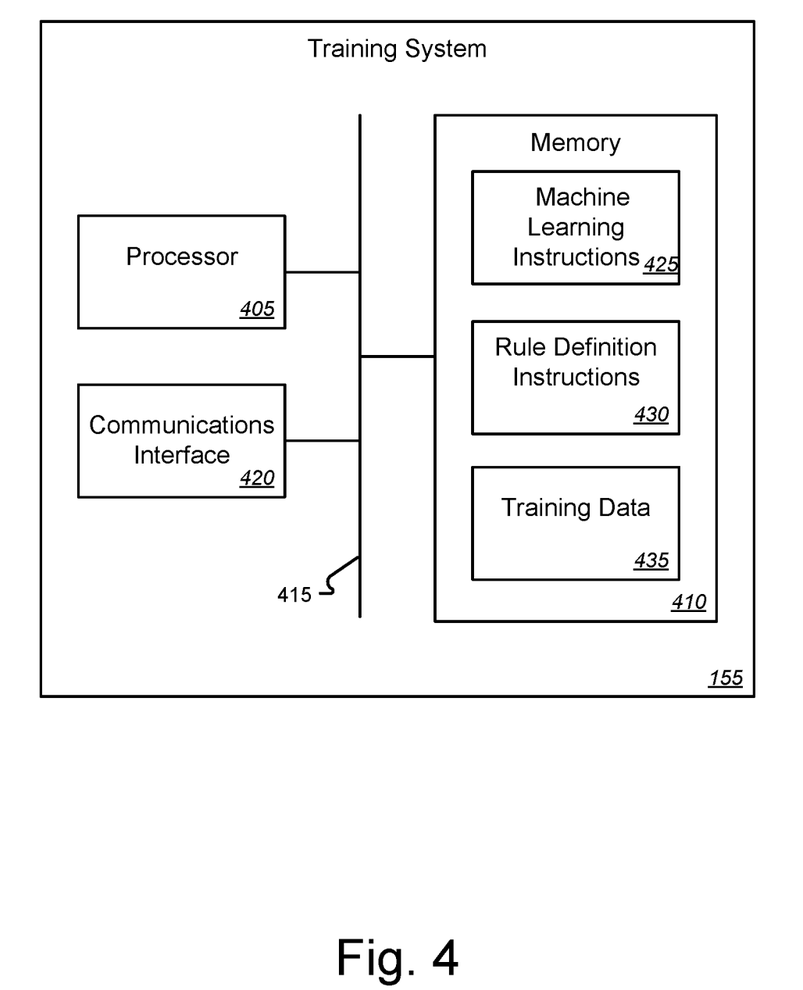
FIG. 4 is a block diagram illustrating additional details of components of an exemplary training system according to one embodiment of the present disclosure.

FIG. 4 is a block diagram illustrating additional details of components of an exemplary training system according to one embodiment of the present disclosure. As illustrated in this example, the training system 155 can comprise a processor 405 such as any of the various types of processors described above. A memory 410 can be coupled with and readable by the processor 405 via a communications bus 415. The memory 410 can comprise any one or more of the different types of volatile and/or non-volatile memories described above. The processor 405 can also be coupled with one or more communication interfaces 420 via the communications bus 415. The communication interfaces 420 can comprise, for example, Ethernet, Bluetooth, WiFi, or other type of wired or wireless communications interfaces.

The memory 410 can store therein a set of machine learning instructions 425 which, when executed by the processor 405, causes the processor 405 to maintain the model 150 of interactions between entities in a gaming environment by monitoring interactions between a plurality of players 115 and 120 in the virtual casino 130 and training the model 150 based on the monitored interactions between the plurality of players 115 and 125 in the virtual casino 130. Additionally, or alternatively, the machine learning instructions 425 can cause the processor 405 to maintain the model 150 of interactions between entities in a gaming environment by monitoring interactions between a plurality of players in a physical casino and training the model 150 based on the monitored interactions between the plurality of players in the physical casino. The machine learning instructions 425 can additionally, or alternatively, cause the processor 405 to maintain the model 150 of interactions between entities in a gaming environment can by monitoring the interacting with the human player 125A in the virtual casino 130 through the presented representation 140C of the bot 145 and training the model 150 based on the monitored interacting with the human player 125A in the virtual casino 130 through the presented representation 140C of the bot 145.

In some cases, the memory 410 can also store a set of rule definition instructions 430. When executed by the processor 405, the rule definition instructions 430 can cause the processor 405 to define one or more rules 220 for the interactions between entities in the virtual casino 130. These rules 220 can be stored with the model 150 or elsewhere and can be applied by the VR system 105 to interactions within the virtual casino 130.

Figure 5:
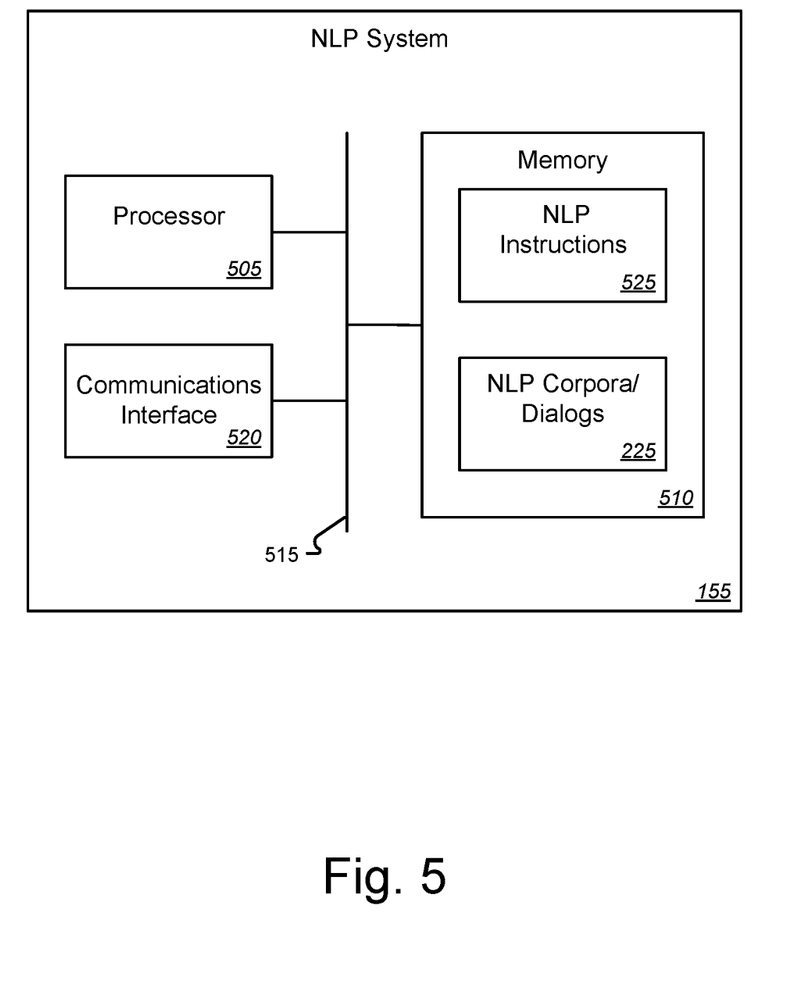
FIG. 5 is a block diagram illustrating additional details of components of an exemplary natural language processing system according to one embodiment of the present disclosure.

FIG. 5 is a block diagram illustrating additional details of components of an exemplary natural language processing system according to one embodiment of the present disclosure. As illustrated in this example, the NPL system 1555 can comprise a processor 505 such as any of the various types of processors described above. A memory 510 can be coupled with and readable by the processor 505 via a communications bus 515. The memory 510 can comprise any one or more of the different types of volatile and/or non-volatile memories described above. The processor 505 can also be coupled with one or more communication interfaces 520 via the communications bus 515. The communication interfaces 520 can comprise, for example, Ethernet, Bluetooth, WiFi, or other type of wired or wireless communications interfaces.

The memory 510 can store therein a set of NPL instructions 525 which, when executed by the processor 505, causes the processor 505 to generate text and/or audio representations of human speech using an NPL corpora and/or set of dialogs 225 using methods as known in the art. The text and/or audio can be generated based on requests received from VR system 105 via the communications interface and based on the VR systems 105 interactions with a human player 115. The NPL corpora and/or set of dialogs 225 can be stored and maintained in the memory 510 of the NPL system 155 or as part of the model 160 of interactions between entities. The NPL instructions can also receive from the VR system 105, through the communications interface 520, text or audio received by the VR system 105 from a player 115 and process that text or audio into a set of entity, intent, and sentiment information to be returned to the VR system 105 using methods as known in the art.

Figure 6:
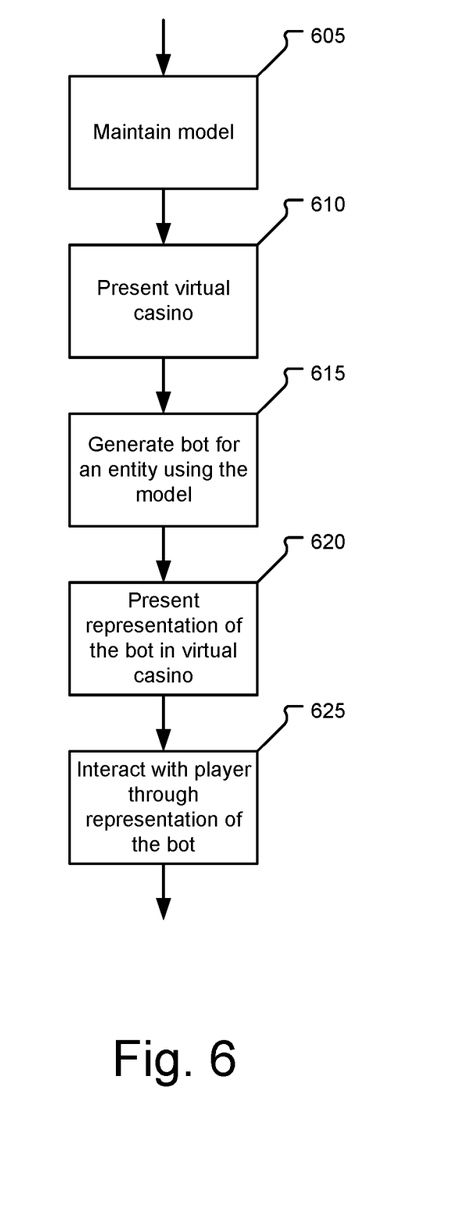
FIG. 6 is a flowchart illustrating an exemplary process for providing a virtual casino according to one embodiment of the present disclosure.

FIG. 6 is a flowchart illustrating an exemplary process for providing a virtual casino according to one embodiment of the present disclosure. As illustrated in this example, providing a virtual casino 130 can comprise maintaining 605 a model 150 of virtual casino interactions representing interactions between entities in a gaming environment. The interactions between entities in the gaming environment represented by the model 150 can comprise verbal communications and physical actions.

A representation of the virtual casino 130 can be presented 610 to a user device 115 through a communications network 110. A bot 145 for an entity can be generated 615 based on the model 150 and a representation 140C of the bot 145 for the entity in the virtual casino 130 can be presented 620 through the communications network 110 to the user device 115. The bot 145 can interact 625 with a human player 125A in the virtual casino 130 through the presented representation 140C of the bot 145 based on the model 150 and using a natural language processing system 155. For example, the bot 145 for the entity can comprise a bot 145 representing a player in the virtual casino 130. In such cases, interacting 625 with the human player 125A in the virtual casino 130 through the presented representation 140C of the bot 145 can comprise playing a game with the human player 125A. In other example, the bot 145 for the entity can comprise a bot 145 representing a spectator in the virtual casino 130 and/or a bot representing a staff member in the virtual casino 130.

In some cases, the bot 145 for the entity can comprise a bot 145 for the first human player 125A. In such cases, interacting 625 with the first human player 125A in the virtual casino through the representation of the bot 145 can comprise interacting with a second human player 125B in the virtual casino 130. For example, interacting 625 with the second human player 125B in the virtual casino 130 can comprise conducting a game with the first human player 125A and the second human player 125B. In another example, interacting 625 with the first human player 125A in the virtual casino 130 through the representation 140C of the bot 145 can comprise providing a recommendation to the first human player 125A. In yet another example, interacting 625 with the first human player 125A in the virtual casino 130 through the representation 140C of the bot 145 can comprise providing a responsible gaming prompt.

Figure 7:
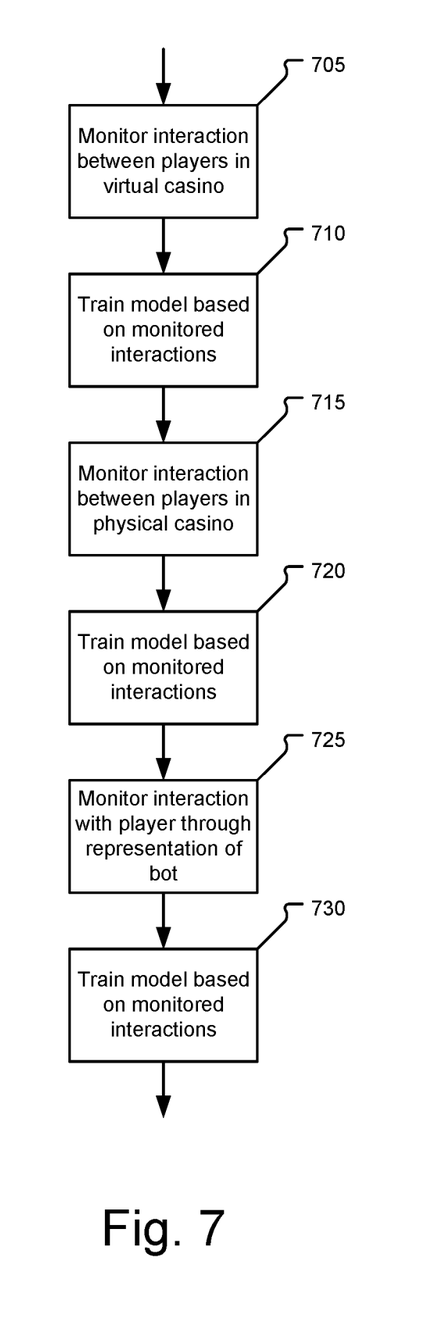
FIG. 7 is a flowchart illustrating an exemplary process for maintaining a model of interactions between entities in a virtual casino according to one embodiment of the present disclosure.

FIG. 7 is a flowchart illustrating an exemplary process for maintaining a model of interactions between entities in a virtual casino according to one embodiment of the present disclosure. As illustrated in this example, maintaining the model 150 of interactions between entities in a gaming environment can comprise monitoring 705 interactions between a plurality of players in the virtual casino 130 and training 710 the model based on the monitored interactions between the plurality of players in the virtual casino 130. Additionally, or alternatively, maintaining the model 150 of interactions between entities in a gaming environment can comprise monitoring 715 interactions between a plurality of players in a physical casino and training 720 the model 150 based on the monitored interactions between the plurality of players in the physical casino. Maintaining the model 150 of interactions between entities in a gaming environment can additionally, or alternatively, comprise monitoring 725 the interacting with the human player 125A in the virtual casino 130 through the presented representation 140C of the bot 145 and training 730 the model based on the monitored interacting with the human player 125A in the virtual casino 130 through the presented representation 140C of the bot 145.

A number of variations and modifications of the disclosure can be used. It would be possible to provide for some features of the disclosure without providing others.

The present disclosure contemplates a variety of different gaming systems each having one or more of a plurality of different features, attributes, or characteristics. A "gaming system" as used herein refers to various configurations of: (a) one or more central servers, central controllers, or remote hosts; (b) one or more electronic gaming machines such as those located on a casino floor; and/or (c) one or more personal gaming devices, such as desktop computers, laptop computers, tablet computers or computing devices, personal digital assistants, mobile phones, and other mobile computing devices. Moreover, an EGM as used herein refers to any suitable electronic gaming machine which enables a player to play a game (including but not limited to a game of chance, a game of skill, and/or a game of partial skill) to potentially win one or more awards, wherein the EGM comprises, but is not limited to: a slot machine, a video poker machine, a video lottery terminal, a terminal associated with an electronic table game, a video keno machine, a video bingo machine located on a casino floor, a sports betting terminal, or a kiosk, such as a sports betting kiosk.

In various embodiments, the gaming system of the present disclosure includes: (a) one or more electronic gaming machines in combination with one or more central servers, central controllers, or remote hosts; (b) one or more personal gaming devices in combination with one or more central servers, central controllers, or remote hosts; (c) one or more personal gaming devices in combination with one or more electronic gaming machines; (d) one or more personal gaming devices, one or more electronic gaming machines, and one or more central servers, central controllers, or remote hosts in combination with one another; (e) a single electronic gaming machine; (f) a plurality of electronic gaming machines in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity and unless specifically stated otherwise, "EGM" as used herein represents one EGM or a plurality of EGMs, "personal gaming device" as used herein represents one personal gaming device or a plurality of personal gaming devices, and "central server, central controller, or remote host" as used herein represents one central server, central controller, or remote host or a plurality of central servers, central controllers, or remote hosts.

As noted above, in various embodiments, the gaming system includes an EGM (or personal gaming device) in combination with a central server, central controller, or remote host. In such embodiments, the EGM (or personal gaming device) is configured to communicate with the central server, central controller, or remote host through a data network or remote communication link. In certain such embodiments, the EGM (or personal gaming device) is configured to communicate with another EGM (or personal gaming device) through the same data network or remote communication link or through a different data network or remote communication link. For example, the gaming system includes a plurality of EGMs that are each configured to communicate with a central server, central controller, or remote host through a data network.

In certain embodiments in which the gaming system includes an EGM (or personal gaming device) in combination with a central server, central controller, or remote host, the central server, central controller, or remote host is any suitable computing device (such as a server) that includes at least one processor and at least one memory device or data storage device. As further described herein, the EGM (or personal gaming device) includes at least one EGM (or personal gaming device) processor configured to transmit and receive data or signals representing events, messages, commands, or any other suitable information between the EGM (or personal gaming device) and the central server, central controller, or remote host. The at least one processor of that EGM (or personal gaming device) is configured to execute the events, messages, or commands represented by such data or signals in conjunction with the operation of the EGM (or personal gaming device). Moreover, the at least one processor of the central server, central controller, or remote host is configured to transmit and receive data or signals representing events, messages, commands, or any other suitable information between the central server, central controller, or remote host and the EGM (or personal gaming device). The at least one processor of the central server, central controller, or remote host is configured to execute the events, messages, or commands represented by such data or signals in conjunction with the operation of the central server, central controller, or remote host. One, more than one, or each of the functions of the central server, central controller, or remote host may be performed by the at least one processor of the EGM (or personal gaming device). Further, one, more than one, or each of the functions of the at least one processor of the EGM (or personal gaming device) may be performed by the at least one processor of the central server, central controller, or remote host.

In certain such embodiments, computerized instructions for controlling any games (such as any primary or base games and/or any secondary or bonus games) displayed by the EGM (or personal gaming device) are executed by the central server, central controller, or remote host. In such "thin client" embodiments, the central server, central controller, or remote host remotely controls any games (or other suitable interfaces) displayed by the EGM (or personal gaming device), and the EGM (or personal gaming device) is utilized to display such games (or suitable interfaces) and to receive one or more inputs or commands. In other such embodiments, computerized instructions for controlling any games displayed by the EGM (or personal gaming device) are communicated from the central server, central controller, or remote host to the EGM (or personal gaming device) and are stored in at least one memory device of the EGM (or personal gaming device). In such "thick client" embodiments, the at least one processor of the EGM (or personal gaming device) executes the computerized instructions to control any games (or other suitable interfaces) displayed by the EGM (or personal gaming device).

In various embodiments in which the gaming system includes a plurality of EGMs (or personal gaming devices), one or more of the EGMs (or personal gaming devices) are thin client EGMs (or personal gaming devices) and one or more of the EGMs (or personal gaming devices) are thick client EGMs (or personal gaming devices). In other embodiments in which the gaming system includes one or more EGMs (or personal gaming devices), certain functions of one or more of the EGMs (or personal gaming devices) are implemented in a thin client environment, and certain other functions of one or more of the EGMs (or personal gaming devices) are implemented in a thick client environment. In one such embodiment in which the gaming system includes an EGM (or personal gaming device) and a central server, central controller, or remote host, computerized instructions for controlling any primary or base games displayed by the EGM (or personal gaming device) are communicated from the central server, central controller, or remote host to the EGM (or personal gaming device) in a thick client configuration, and computerized instructions for controlling any secondary or bonus games or other functions displayed by the EGM (or personal gaming device) are executed by the central server, central controller, or remote host in a thin client configuration.

In certain embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include a local area network (LAN) in which the EGMs (or personal gaming devices) are located substantially proximate to one another and/or the central server, central controller, or remote host. In one example, the EGMs (or personal gaming devices) and the central server, central controller, or remote host are located in a gaming establishment or a portion of a gaming establishment.

In other embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include a wide area network (WAN) in which one or more of the EGMs (or personal gaming devices) are not necessarily located substantially proximate to another one of the EGMs (or personal gaming devices) and/or the central server, central controller, or remote host. For example, one or more of the EGMs (or personal gaming devices) are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs (or personal gaming devices) are located. In certain embodiments in which the communication network includes a WAN, the gaming system includes a central server, central controller, or remote host and an EGM (or personal gaming device) each located in a different gaming establishment in a same geographic area, such as a same city or a same state. Gaming systems in which the communication network includes a WAN are substantially identical to gaming systems in which the communication network includes a LAN, though the quantity of EGMs (or personal gaming devices) in such gaming systems may vary relative to one another.

In further embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include an internet (such as the Internet) or an intranet. In certain such embodiments, an Internet browser of the EGM (or personal gaming device) is usable to access an Internet game page from any location where an Internet connection is available. In one such embodiment, after the EGM (or personal gaming device) accesses the Internet game page, the central server, central controller, or remote host identifies a player before enabling that player to place any wagers on any plays of any wagering games. In one example, the central server, central controller, or remote host identifies the player by requiring a player account of the player to be logged into via an input of a unique player name and password combination assigned to the player. The central server, central controller, or remote host may, however, identify the player in any other suitable manner, such as by validating a player tracking identification number associated with the player; by reading a player tracking card or other smart card inserted into a card reader; by validating a unique player identification number associated with the player by the central server, central controller, or remote host; or by identifying the EGM (or personal gaming device), such as by identifying the MAC address or the IP address of the Internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the Internet browser of the EGM (or personal gaming device). Examples of implementations of Internet-based gaming are further described in U.S. Pat. No. 8,764,566, entitled "Internet Remote Game Server," and U.S. Pat. No. 8,147,334, entitled "Universal Game Server."

The central server, central controller, or remote host and the EGM (or personal gaming device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs (or personal gaming devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

As should be appreciated by one skilled in the art, aspects of the present disclosure have been illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (Saas).

Aspects of the present disclosure have been described herein with reference to flowchart illustrations and/or block diagrams of methods, apparatuses (systems) and computer program products according to embodiments of the disclosure. It should be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

What is claimed is:

1. A method for providing a virtual casino, the method comprising:
    monitoring, by a virtual casino management system, interactions between a plurality of live players in a physical casino;
    training, by a virtual casino management system, a model of virtual casino interactions representing interactions between entities in a gaming environment based on the monitoring of the interactions between the plurality of live players in the physical casino, wherein the interactions between entities in the gaming environment represented by the model comprise verbal communications and physical actions;
    presenting, by the virtual casino management system, a representation of the virtual casino to a user device through a communications network;
    generating, by the virtual casino management system, a bot for an entity based on the model;
    presenting, by the virtual casino management system, a representation of the bot for the entity in the virtual casino through the communications network to the user device; and
    interacting, by the virtual casino management system, with a human player in the virtual casino through the presented representation of the bot based on the model and using a natural language processing system.

2. The method of claim 1, wherein the bot for the entity comprises a bot representing a player in the virtual casino.

3. The method of claim 2, wherein interacting with the human player in the virtual casino through the presented representation of the bot comprises playing a game with the human player.

4. The method of claim 1, wherein the bot for the entity comprises a bot representing a spectator in the virtual casino.

5. The method of claim 1, wherein the bot for the entity comprises a bot representing a staff member in the virtual casino.

6. The method of claim 1, wherein training the model of interactions between entities in a gaming environment further comprises:
    monitoring interactions between a plurality of players in the virtual casino; and
    training the model based on the monitored interactions between the plurality of players in the virtual casino.

7. The method of claim 1, wherein training the model of interactions between entities in a gaming environment further comprises:
    monitoring the interacting with the human player in the virtual casino through the presented representation of the bot; and
    training the model based on the monitored interacting with the human player in the virtual casino through the presented representation of the bot.

8. A system comprising:
    a communications interface;
    a processor coupled with the communications interface; and
    a memory coupled with a and readable by the processor and storing therein a set of instructions which, when executed by the processor, causes the processor to:
        monitor interactions between a plurality of live players in a physical casino;
        train a model of virtual casino interactions representing interactions between entities in a gaming environment based on the monitoring of the interactions between the plurality of live players in the physical casino, wherein the interactions between entities in the gaming environment represented by the model comprise verbal communications and physical actions;
        present a representation of the virtual casino to a user device through the communications interface;
        generate a bot for an entity based on the model;
        present a representation of the bot for the entity in the virtual casino through the communication interface to the user device; and
        interact with a first human player in the virtual casino through the presented representation of the bot based on the model and using a natural language processing system.

9. The system of claim 8, wherein the bot for the entity comprises a bot for the first human player.

10. The system of claim 9, wherein interacting with the first human player in the virtual casino through the representation of the bot comprises interacting with a second human player in the virtual casino.

11. The system of claim 10, wherein the interacting with the second human player in the virtual casino comprises conducting a game with the first human player and the second human player.

12. The system of claim 9, wherein interacting with the first human player in the virtual casino through the representation of the bot comprises providing a recommendation to the first human player.

13. The system of claim 9, wherein interacting with the first human player in the virtual casino through the representation of the bot comprises providing a responsible gaming prompt.

14. A non-transitory, computer-readable medium comprising a set of instructions stored therein which, when executed by a processor, causes the processor to:
    monitor interactions between a plurality of live players in a physical casino;
    train a model of virtual casino interactions representing interactions between entities in a gaming environment based on the monitoring of the interactions between the plurality of live players in the physical casino, wherein the interactions between entities in the gaming environment represented by the model comprise verbal communications and physical actions;
    present a representation of the virtual casino through a communications interface to a user device;
    generate a bot for an entity based on the model;
    present a representation of the bot for the entity in the virtual casino presented through the communications interface to the user device; and
    interact with a human player in the virtual casino through the presented representation of the bot based on the model and using a natural language processing system.

15. The non-transitory, computer-readable medium of claim 14, wherein the instructions further cause the processor to receive an information feed and wherein interacting with the human player is further based on the received information feed.

16. The non-transitory, computer-readable medium of claim 14, wherein the bot is configurable by the human player.

17. The non-transitory, computer-readable medium of claim 14, wherein the bot is automatically generated by a virtual casino management system.

18. The non-transitory, computer-readable medium of claim 14, wherein the representation of the bot for the entity comprises a representation of a human.

19. The non-transitory, computer-readable medium of claim 14, wherein the representation of the bot for the entity comprises a representation of an animal.

\* \* \* \* \*